United States Patent [19]
Asakawa et al.

[11] Patent Number: 5,480,542
[45] Date of Patent: Jan. 2, 1996

[54] PACKINGS COMBINING PROTEIN TO A SUPPORT VIA A SPACER

[75] Inventors: Naoki Asakawa; Yoshiya Oda, both of Ibaraki; Yutaka Yoshida, Saitama; Tadashi Sato, Chiba, all of Japan

[73] Assignee: Eisai Co., Ltd., Tokyo, Japan

[21] Appl. No.: 294,113

[22] Filed: Aug. 22, 1994

Related U.S. Application Data

[62] Division of Ser. No. 39,511, Mar. 29, 1993, Pat. No. 5,354,461, which is a continuation of Ser. No. 837,290, Feb. 18, 1992, abandoned.

[30] Foreign Application Priority Data

Feb. 20, 1991 [JP] Japan ................................. 3-45655
May 20, 1991 [JP] Japan ................................. 3-142724
Jul. 31, 1991 [JP] Japan ................................. 3-213173

[51] Int. Cl.⁶ ............................................ B01D 15/08
[52] U.S. Cl. ................... 210/198.2; 210/502.1; 210/635; 210/656; 502/403
[58] Field of Search ......................... 210/635, 656, 210/198.2, 502.1; 502/403; 530/413; 436/176, 179, 181

[56] References Cited

U.S. PATENT DOCUMENTS

| | | | |
|---|---|---|---|
| 3,873,514 | 3/1975 | Chu | 210/635 |
| 3,917,527 | 11/1975 | Shaltiel | 210/635 |
| 4,177,038 | 12/1979 | Biebricher | 210/635 |
| 4,318,819 | 3/1982 | Malloy | 210/635 |
| 4,324,681 | 4/1982 | House | 210/635 |
| 4,431,544 | 2/1984 | Atkinson | 210/502.1 |
| 4,431,546 | 2/1984 | Hughes | 210/656 |
| 4,532,232 | 7/1985 | Larsson | 502/403 |
| 4,604,207 | 8/1986 | Oi | 210/635 |
| 4,612,121 | 9/1986 | Hermanson | 210/635 |
| 4,716,219 | 12/1987 | Eggimann | 210/635 |
| 4,822,681 | 4/1989 | Schossler | 210/635 |
| 4,837,348 | 6/1989 | Stolowitz | 210/635 |
| 5,030,354 | 7/1991 | Miwa et al. | 210/635 |
| 5,092,992 | 3/1992 | Crane | 210/635 |

FOREIGN PATENT DOCUMENTS

| | | | |
|---|---|---|---|
| 0109653 | 5/1984 | European Pat. Off. | 210/198.2 |
| 0221505 | 5/1987 | European Pat. Off. | 210/198.2 |
| 0295073 | 12/1988 | European Pat. Off. | 210/198.2 |
| 643129 | 1/1989 | Japan | 502/403 |
| 193544 | 4/1989 | Japan | 502/403 |
| 1419717 | 8/1988 | U.S.S.R. | 502/403 |

OTHER PUBLICATIONS

Perry, Separation and Purification, 3rd Ed. vol. XII in Techniques of Chemistry (New York) John Wiley, 1978, pp. 257–293.

Mikes Laboratory Handbook of Chromatographic and Allied Methods Ellis Horwood Limited, Chichester, 1979, pp. 388–391.

Analytical Biochemistry 72, 248–254 (1976), Rapid and Sensitive Method for Quantitation of Microgram Quantities of Protein Utilizing Principle of Protein–Dye Binding, Marion M. Bradford.

Anal. Chem. 1985, 1757–1763, Internal Surface Reversed–Phase Silica Supports for Liquid Chromatography, Hagestam et al.

Abstracts of Japan; vol. 12, No. 334 (P–756) [3181]; Sep. 8, 1988; Abstract for JP 63–96553, Packing Material.

*Primary Examiner*—Ernest G. Therkorn
*Attorney, Agent, or Firm*—Flynn, Thiel, Boutell & Tanis

[57] ABSTRACT

A packing for chromatography whereby a low molecular weight substance contained in biological samples can be analyzed directly at a high accuracy without any pretreatments. This packing is combining a protein such as avidin and ovomucoid to the support via a straight or branched spacer optionally having a functional group such as a cyano group. Enantiomers interact differentially with proteins, and thereby optically separated. Further, a purification column packed with said packing is disclosed. According to the present invention, a low molecular weight substance can be directly and accurately analyzed without requiring any pretreatment for removing biological macromolecules. When it is employed in the purification column, the time required for the pretreatment can be shortened.

14 Claims, 1 Drawing Sheet

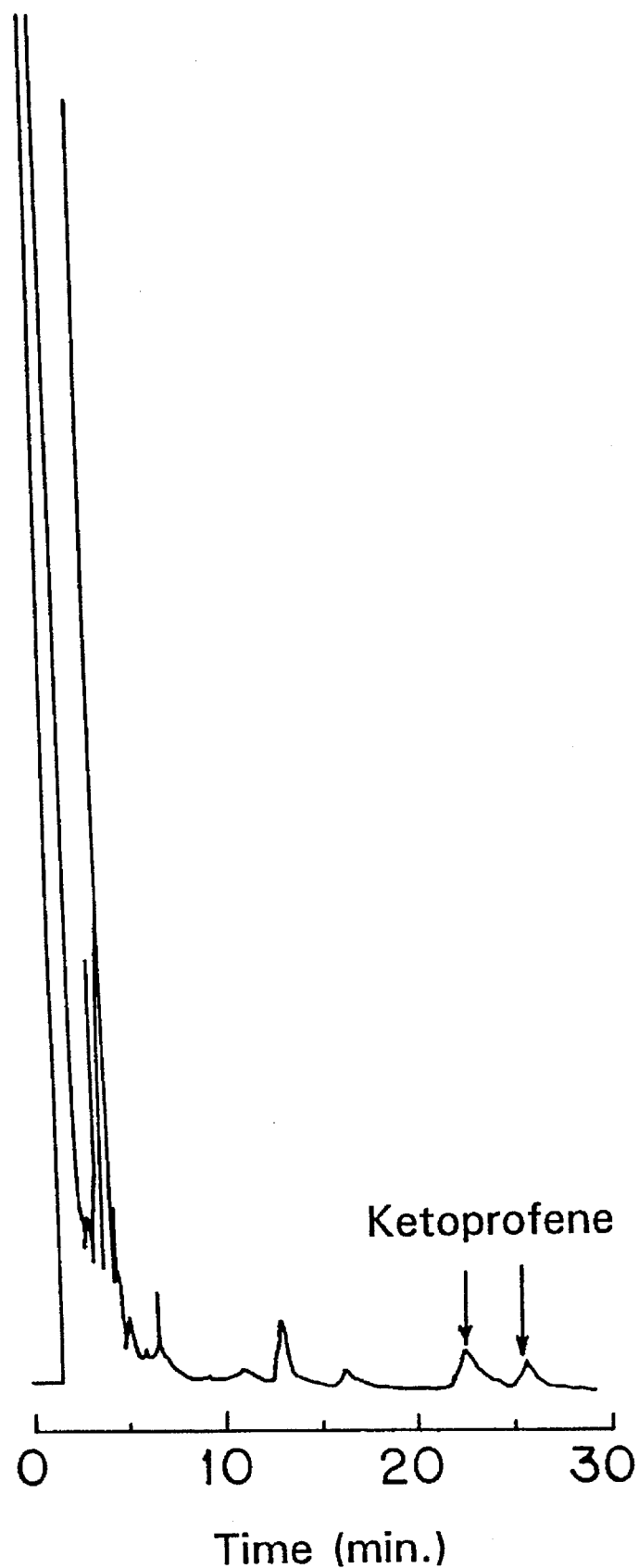

PACKINGS COMBINING PROTEIN TO A SUPPORT VIA A SPACER

This is a division of Ser. No. 08/039,511, filed Mar. 29, 1993, now U.S. Pat. No. 5,354,461, which in turn, is a continuation of Ser. No. 07/837,290, filed Feb. 18, 1992, now abandoned.

FIELD OF THE INVENTION

This invention relates to a packing, wherein a protein is bound to a support via a spacer, for high-performance liquid chromatography and for purification.

PRIOR ART

In recent years, high-performance liquid chromatography has been widely used for qualitatively or quantitatively analyzing and separating a number of substances. The separation ability of high-performance liquid chromatography largely depends on the column to be connected and, therefore, various columns have been marketed. Reversed-phase chromatography, wherein a carbon chain is bound to a support such as silica gel, have been most commonly employed.

On the other hand, analysis by high-performance liquid chromatography achieves a high sensitivity and, therefore, is frequently used for the determination of substances, for example, drugs in plasma. When analyzed with the use of, in particular, reversed-phase chromatography, however, high-molecular-weight proteins in biological samples denature at the reversed-phase interface and adsorb onto the support. Thus an accumulation of proteins deteriorate the column performance or elevate the pressure drop. Therefore, there is needed tedious and time-consuming pretreatment procedures such as deproteinization.

In order to solve these problems, Pinkerton et al. [*Anal. Chem.*, 57, 1757–1788 (1985)] developed an internal surface reversed-phase silica support for liquid chromatography.

DISCLOSURE OF THE INVENTION

Although the aforesaid column developed by Pinkerton et al. is excellent in the elimination of the interference of the analysis due to biological substances, it is unsatisfactory from the viewpoints of the retention of low molecular weight substances and separation ability. The present inventors have conducted extensive studies in order to develop a packing which can exclude macromolecules, such as a serum protein, without destructive accumulation and can retain small molecules, such as drugs. As a result, they have successfully found out that the disadvantages observed in the conventional columns can be solved by using a packing of the constitution as will be specified below, thus completing the present invention.

Accordingly, the present invention relates to a packing wherein a protein, which is optionally chemically modified, is bound to a support via a spacer. The present invention makes it possible to analyze low molecular weight substances while retaining a sufficient retention time and separation ability without accumulation of proteins even when biological samples are directly injected into the column. Namely, these are the objects of the present invention.

The protein to be used in the present invention is not particularly restricted. Preferable examples thereof include avidin, ovomucoid, ovomucin and ovalbumin. Avidin is a basic glycoprotein having a molecular weight of approximately 68,000 and contained in albumen and involves saccharides such as mannose and hexosamine. Ovomucoid is a glycoprotein having a molecular weight of 28,000 and an isoelectric point of about pH 4 and contained in albumen and involves N-acetylglucosamine and mannose as the constituting saccharides. Ovalbumin is a glycoprotein contained in the largest amount in albumen. It has a molecular weight of 45,000 and glucosamine and mannose are bound thereto. Ovomucin is a glycoprotein contained in albumen. It is important in the present invention that a protein of a molecular weight of several thousands to several hundreds of thousands be bound to a support via a spacer. The protein is not restricted to the glycoproteins as cited above. Either one of these proteins or a combination thereof may be used. The durability of these proteins may be further improved by chemical modification, for example, glutarylation, dihydroxylation or acylation.

The spacer, that is carbon chain, to be used in the present invention is a straight or branched one and a cyano group or an aryl group may be optionally bound to any of the carbon atoms of the chain as a side chain. The carbon chain may further contain an aryl group or a disulfide bond therein. The term "aryl group" as used herein means an optionally substituted phenyl or naphthyl group. Although a straight $C_3$ to $C_{18}$ chain is preferable therefor, the most desirable carbon atom number is to be determined depending on the character of the protein bound to the terminal thereof. For example, when avidin is used as a protein to be bound to an aminopropyl silica gel, a straight $C_6$ to $C_{10}$ chain is desirable. Both ends of the carbon chain are chemically bound respectively to the protein and to the support. The chemical bonds are not particularly restricted. For example, the carbon chain may be bound via amide bond to an amino group of the protein and an amino group of the support.

In the present invention, any support commonly employed in the art may be used. For example, silica gel, cellulose, glass and synthetic polymers are usable therefor. The support should have a functional group for binding to the carbon chain. When the support has no functional group, it is required to introduce a suitable one thereinto. For example, aminopropyl silica gel, which has a functional group, is suitable for the production of the support of the present invention.

The column of the present invention packed with said packing, wherein said protein is bound to the support via a spacer, is usable as a column for high performance liquid chromatography.

The column of the present invention packed with the packing, wherein said protein is bound to the support via the spacer, further exerts excellent effects of eliminating blood proteins in a pretreatment step.

In order to determine the structure of a trace low molecular weight substance such as a drug contained in blood by, for example, mass spectrometry, it is always necessary to remove macromolecules such as plasma proteins and thus a highly complicated procedure has been required therefor hitherto. In the case of the column of the present invention, however, these large molecule substances can be excluded simply by passing a sample therethrough with the use of, for example, a syringe. More specifically, high molecular weight substances such as plasma proteins are not retained on the column but flow therethrough, while low molecular weight ones such as drugs are retained onto the column. After eluting the interfering substances such as plasma proteins, the low-molecular-weight substances such as drugs can be easily purified by eluting with an appropriate solvent.

The packing of the present invention may be produced by the following method.

A compound having a carbon chain and groups capable of reacting with primary amine groups on both ends of the carbon chain, for example, disuccinimidyl suberate (hereinafter abbreviated to DSS) is dissolved in acetonitrile. Further, a sodium hydrogencarbonate buffer solution and aminopropyl silica gel are added thereto and the mixture is allowed to react. After thoroughly washing the organic solvent, the mixture is further reacted with a protein having an amino group in a sodium hydrogencarbonate buffer solution. Thus a packing to which a protein is bound via a spacer, that is a carbon chain, is obtained.

When a chemically modified protein is to be used, further, a protein such as ovomucoid and glutaraldehyde are introduced into a phosphate buffer solution (pH: 6.8) and stirred at 30° C. for 15 hours. Thus glutarylated ovomucoid (unreduced type) is obtained.

Further, glutarylated ovomucoid of reduced type can be obtained from glutarylated ovomucoid (unreduced type) by using sodium borohydride and stirring it in a phosphate buffer solution (pH: 6.8) at 4° C. for 12 hours.

Next, disuccinimidyl suberate is dissolved in acetonitrile. Then a sodium hydrogencarbonate buffer solution and aminopropyl silica gel are added thereto and the mixture is allowed to react. After thoroughly washing the organic solvent, the aforesaid chemically modified protein is reacted with an aminopropyl silica gel having a carbon chain originated from the succinimidyl suberate in a sodium hydrogencarbonate buffer solution. Thus a packing to which the chemically modified protein is bound can be obtained.

Alternately, a packing to which a chemically modified protein is bound can be obtained by chemically modifying a packing to which a protein is bound via a spacer (a carbon chain).

A low molecular weight substance can be analyzed at a high accuracy by connecting the column of the present invention to a high-performance liquid chromatograph and injecting the low molecular weight substance together with biological fluids thereinto.

Although the detailed mechanism of this system has not been fully clarified, it can be assumed as follows; When a low molecular weight compound is injected, together with biological fluids, into the column of the present invention connected to a high-performance liquid chromatograph, high molecular weight substances contained in the biological fluids, for example, albumin and globulin, cannot pass through the protein located on the surface of the packing of the present invention, while proteins, which are hydrophilic, flow therethrough without being retained onto the column.

On the other hand, low molecular weight substances pass through the protein and reach the spacer (carbon chain) where they suffer from hydrophobic interactions and thus separate into various components. Furthermore, the present inventors have surprisingly found out that optical isomers of low molecular weight substances can be resolved by using an optically active substance as the protein. This is a remarkable function which has never been achieved by any conventional reversed phase packing or column.

Some packings or columns such as the ovomucoid column invented by Miwa et. al. (U.S. Pat. No. 5,080,854) also have the ability to separate optical isomers, but the packing or the column of the present invention can resolve them more effectively.

Namely, the packing or the column of the present invention makes it possible not only to analyze a low molecular weight substance in biological fluids at a high accuracy without any pretreatment but also to optically resolve said substance.

When the column of the present invention is used as, for example, a pretreatment column for determining the concentration of a drug in plasma, small molecule substances in the plasma can be separated without carrying out such a complicated pretreatment procedure as that required in prior art. Thus the time required for the pretreatment can be remarkably shortened.

Table 1 shows the results of the determination of the recovery yield of proteins in plasma with the use of a column packed with a packing wherein avidin or ovalbumin is bound to an aminopropyl silica gel support via a $C_6$ carbon chain as a spacer. 20 µl of human plasma was injected into the column connected to a high-performance liquid chromatograph and the eluate from the column was collected for 10 minutes and the proteins contained therein were determined. The proteins were determined by colorimetry in accordance with Bradford's method [*Analytical Biochemistry*, 72, 248–254 (1976)].

TABLE 1

| Column | pH 2 | pH 4.5 | pH 7 |
|---|---|---|---|
| Avidin | 97% | 24% | 92% |
| Ovalbumin | 87% | 3% | 72% |

As Table 1 shows, the proteins in the plasma are scarcely adsorbed by the column of the present invention at pH 2 and pH 7. The poor recovery yield at pH 4.5 is seemingly due to the fact that the isoelectric points of the proteins in the plasma are around a pH of 4.5 and thus the proteins, the hydrophobic properties of which are elevated, are retained by the column.

BRIEF DESCRIPTION OF THE DRAWING

FIG. 1 shows a chromatogram obtained by injecting ketoprofene enantiomers contained in human plasma into a column packed with the packing of the present invention.

DESCRIPTION OF THE PREFERRED EMBODIMENTS

FIG. 1 shows a chromatogram obtained by injecting ketoprofene enantiomers into the avidin column of the present invention. In this experiment, a sample prepared by adding 50 µg of ketoprofene enantiomers to 20 µl of human plasma was injected into the column.

The high-performance liquid chromatography was carried out under the following conditions.

mobile phase: 5 vol. % acetonitrile/95 vol. % 0.1M potassium phosphate buffer solution (pH: 7), flow rate: 1 ml/min, detection wavelength: 260 nm.

FIG. 1 shows that ketoprofene can be analyzed without being interfered by plasma components. It is further obvious that the ketoprofene can be optically resolved simultaneously.

EXAMPLES

Example 1

3 g of aminopropyl silica gel and 2 g of disuccinimidyl suberate were added to 100 ml of a mixture (1:1 (v:v)) of a 0.1M sodium hydrogencarbonate buffer solution (pH: 6.8) and acetonitrile and stirred overnight. Then the mixture was poured into a glass filter and residues on the filter were thoroughly washed. Thus activated aminopropyl silica gel was obtained. Separately, avidin was dissolved in 100 ml of a 0.1M sodium hydrogencarbonate buffer solution and the activated aminopropyl silica gel was added thereto. After reacting for 16 hours, a packing wherein avidin was bound to the aminopropyl silica gel support via a $C_6$ carbon chain as a spacer, was obtained.

Example 2

The packing obtained in the above Example 1 was packed in a column to thereby give a column for high-performance liquid chromatography.

Example 3

The packing obtained in the above Example 1 was packed in a column to thereby give a column for purifying a low molecular weight substance while removing macromolecule substances such as proteins.

Example 4

3 g of aminopropyl silica gel and 2 g of disuccinimidyl suberate were added to 100 ml of a mixture (1:1 (v:v)) of a 0.1M sodium hydrogencarbonate buffer solution (pH: 6.8) and acetonitrile and stirred overnight. Then the mixture was poured into a glass filter and residues on the filter were thoroughly washed. Thus activated aminopropyl silica gel was obtained. Separately, ovalbumin was dissolved in 100 ml of a 0.1M sodium hydrogencarbonate buffer solution and the activated aminopropyl silica gel was added thereto. After reacting for 16 hours, a packing wherein ovalbumin was bound to the aminopropyl silica gel support via a $C_6$ carbon chain as a spacer, was obtained.

Example 5

The packing obtained in the above Example 4 was packed in a column to thereby give a column for high-performance liquid chromatography.

Example 6

3 g of aminopropyl silica gel and 2 g of disuccinimidyl suberate were added to 100 ml of a mixture (1:1 (v:v)) of a 0.1M sodium hydrogencarbonate buffer solution (pH: 6.8) and acetonitrile and stirred overnight. Then the mixture was poured into a glass filter and residues on the filter were thoroughly washed. Thus activated aminopropyl silica gel was obtained. Separately, ovomucoid was dissolved in 100 ml of a 0.1M sodium hydrogencarbonate buffer solution and the activated aminopropyl silica gel was added thereto. After reacting for 16 hours, a packing wherein ovomucoid was bound to the aminopropyl silica gel support via a $C_6$ carbon chain as a spacer, was obtained.

Example 7

The packing obtained in the above Example 6 was packed in a column to thereby give a column for high-performance liquid chromatography.

Example 8

3 g of aminopropyl silica gel and 2 g of N,N'-disuccinimidyl 1,10-dodecanedioate were added to 100 ml of a mixture (1:1 (v:v)) of a 0.1M sodium hydrogencarbonate buffer solution (pH: 6.8) and acetonitrile and stirred overnight. Then the mixture was poured into a glass filter and residues on the filter were thoroughly washed. Thus activated aminopropyl silica gel was obtained. Separately, avidin was dissolved in 100 ml of a 0.1M sodium hydrogencarbonate buffer solution and the activated aminopropyl silica gel was added thereto. After reacting for 16 hours, a packing wherein avidin was bound to the aminopropyl silica gel support via a $C_{10}$ carbon chain as a spacer, was obtained.

The N,N'-disuccinimidyl 1,10-dodecanedioate was synthesized by the following method. 4.5 g of 1,10-dodecanedioic acid and N,N'-disuccinimidyl carbonate were dissolved in 100 ml of acetonitrile. After adding 3.2 ml of pyridine, the mixture was stirred under reflux for 10 hours. After cooling, the solvent was distilled off under reduced pressure. The crystals thus precipitated were recrystallized from ethyl acetate. Thus 4.2 g of the target compound was obtained in the form of white crystals.

Example 9

The packing obtained in the above Example 8 was packed in a column to thereby give a column for high-performance liquid chromatography.

Example 10

2 g of the packing obtained in the above Example 1 and 0.1 g of glutaraldehyde were added to 30 ml of a 0.06M phosphate buffer solution (pH: 6.8) and stirred at 30° C. for 15 hours. Then the mixture was poured into a glass filter and residues on the filter were thoroughly washed by using a 0.06M phosphate buffer solution (pH: 6.8). Thus a packing to which glutarylated avidin (unreduced type) was bound was obtained. Separately, 0.2 g of sodium boro-hydride was dissolved in a 0.06M phosphate buffer solution (pH: 6.8) and the packing to which glutarylated avidin (unreduced type) was bound was added thereto. Reduction was effected by stirring at 4° C. for 12 hours. Thus a packing to which glutarylated avidin (reduced type) was bound was obtained.

Example 11

The packing to which glutarylated avidin (reduced type) was bound and obtained in the above Example 10 was packed in a column to thereby give a column for high-performance liquid chromatography.

Example 12

Aminopropyl silica gel was packed into stainless-steel columns by conventional high-pressure slurry-packing procedures. Then, the aminopropyl silica gel (solid phase) was activated by recycling a solution which contained 300 mg of disuccinimidyl suberate in 30 ml of a mixture (1:2 (v:v)) of a 0.1M sodium hydrogencarbonate buffer solution and acetonitrile in the column for 4 hours followed by washing the solid phase with 20 ml of a mixture (1:2 (v:v)) of water and acetonitrile. Then the mobile phase was replaced with 0.1M sodium hydrogencarbonate buffer solution, and 500 mg of a protein dissolved in the same buffer solution was recycled in the column for 4 hours. Thus a column for high-performance liquid chromatography was obtained.

We claim:

1. A high performance liquid chromatography column packed with a packing, said packing comprising a protein bound to one end of a spacer via an amide bond and another end of the spacer bound via an amide bond to a support wherein said support is silica gel, said protein is avidin and said spacer is a straight $C_6$ to $C_{10}$ chain.

2. The column of claim 1, wherein said protein is chemically modified avidin.

3. The column of claim 2, wherein the chemical modification of avidin is glutarylation optionally followed by reduction, dihydroxylation or acylation.

4. The column of claim 1, wherein the one end of the spacer is bound via an amide bond to an amino group on the protein.

5. The column of claim 1, wherein the spacer is bound via said amide bond to an amino group of the support.

6. The column of claim 1, wherein said another end of the spacer is bound to an amino group of silica gel having an aminoalkyl group via said amide bond.

7. The column of claim 1, wherein said spacer optionally contains an amide bond midway in the chain.

8. A purification column packed with a packing, said packing comprising a protein bound to one end of a spacer via an amide bond and another end of the spacer bound via an amide bond to a support wherein said support is silica gel, said protein is avidin and said spacer is a straight $C_6$ to $C_{10}$ chain.

9. The column of claim 8, wherein said protein is chemically modified avidin.

10. The column of claim 9, wherein the chemical modification of avidin is glutarylation optionally followed by reduction, dihydroxylation or acylation.

11. The column of claim 8, wherein the one end of the spacer is bound via an amide bond to an amino group on the protein.

12. The column of claim 8, wherein the spacer is bound via said amide bond to an amino group of the support.

13. The column of claim 8, wherein said another end of the spacer is bound to an amino group of silica gel having an aminoalkyl group via said amide bond.

14. The column of claim 8, wherein said spacer optionally contains an amide bond midway in the chain.

* * * * *